United States Patent [19]

Velie

[11] Patent Number: 4,874,012
[45] Date of Patent: Oct. 17, 1989

[54] MAGNETIC OPERATOR FLOW DEVICE

[75] Inventor: Wallace W. Velie, Alta Loma, Calif.
[73] Assignee: Mallard Products, Inc., Rancho Cucamonga, Calif.
[21] Appl. No.: 256,622
[22] Filed: Oct. 12, 1988
[51] Int. Cl.[4] .......................................... F16K 37/00
[52] U.S. Cl. .................................. 137/557; 137/554; 137/521; 251/65
[58] Field of Search ............... 137/527, 554, 517, 521, 137/557; 251/65

[56] References Cited

U.S. PATENT DOCUMENTS

| | | | |
|---|---|---|---|
| 705,255 | 7/1902 | Leidecker | 137/527 |
| 2,029,633 | 4/1936 | Muhleiser | 137/527 |
| 2,569,316 | 9/1951 | Jerman | 137/517 |
| 2,949,931 | 8/1960 | Ruppright | 251/65 |
| 3,265,062 | 8/1966 | Hesse | 251/65 |
| 3,370,305 | 2/1968 | Goott et al. | 137/527 |
| 3,914,994 | 10/1975 | Bonner | 137/554 |
| 3,958,603 | 5/1976 | Bannon et al. | 137/517 |

Primary Examiner—A. Michael Chambers
Attorney, Agent, or Firm—Fleit, Jacobson, Cohn, Price, Holman & Stern

[57] ABSTRACT

A magnetically operated flow device contains a flow responsive magnetically attractable body within a flow passage defining upstream and downstream directions therein. The body is movable in upstream and downstream directions in the passage. The passage includes upstream and downstream limit positions to define upstream and downstrean limits of movement of the body within the passage. Magnetic means are provided to attract the body against the fluid flow within the passage to the upstream limit position. The body constitutes a drag obstruction to fluid flow through the passage and will, therefore, decouple from its upstream magnetically retained position in the passage and move to the downstream limit position when drag froces (i.e. flow) increase to the design limit value.

6 Claims, 2 Drawing Sheets

MAGNETIC OPERATOR FLOW DEVICE

BACKGROUND OF THE INVENTION

1. FIELD OF THE INVENTION

This invention pertains to flow devices such as valves and switches activated by differential fluid pressure. For example, this invention may be used as an excess fluid flow check valve, or a switch actuator to close an electrical circuit responsive to fluid flow.

2. DESCRIPTION OF RELATED ART

In most cases present fluid flow devices such as check valves are spring loaded toward open positions and when differential pressure exceeds a predetermined value the valves close.

However, there are certain disadvantages to the utilization of spring biased valves, and in particular spring biased poppet-type check valves. A spring exerts increasing force against the flow as the poppet is closing and, thus, the closing action is less positive and less reproducible.

Further, exact reproduction of spring performance is difficult and expensive. Therefore, it is difficult and expensive to make excess flow check valves with repeatably accurate closing pressure. This is especially true for low flow (low differential pressure) excess flow check valves.

Still further, poppet valves and associated springs are relatively heavy and are adversely affected by gravity when differently oriented relative to the direction of gravity forces, especially under low pressure differential operating conditions.

SUMMARY OF THE INVENTION

The magnetic operator of this invention replaces the spring of the present fluid flow devices such as check valves with a magnet. The magnet retains a thin ferrous plate which serves as a poppet. This combination overcomes the disadvantages of the spring biased valves discussed previously. The magnetically operated flow device may be used as an excess flow check valve, as a flow relieving valve and as a switch for controlling an electrical circuit. In addition, it is envisioned that the magnetic flow device also will find other uses.

The magnetic flow device is of such construction and operation that its plate may be of very lightweight construction and used for operation at differential pressures substantially less than one PSI. Accordingly, the operator may be used in natural gas and LPG appliances and in other environments experiencing low fluid flow and low fluid pressure differential situations.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
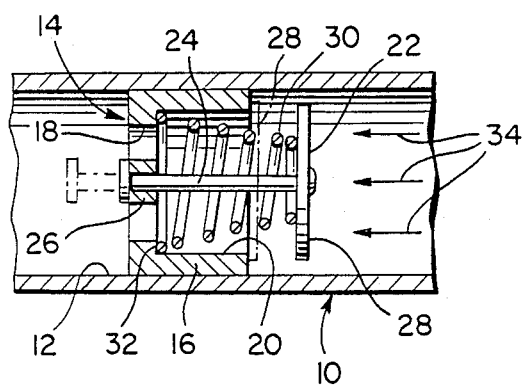
FIG. 1 is a longitudinal sectional view of a prior art-type of spring biased excess fluid flow check valve including a poppet-type valve member.

Referring now more specifically to the drawings, the numeral 10 generally designates a typical fluid flow conduit or other structure defining a fluid flow passage 12 extending therethrough. A flow check valve assembly referred to in general by the reference numeral 14 is disposed within the passage 12 and includes an annular seat body 16 stationarily mounted within the passage 12 in any convenient manner. The seat body defines a fluid flow passage 18 therethrough including an enlarged counter bore 20 on its inlet end and a poppet-type valve 22 is mounted from the seat body 16 for shifting between open and closed positions relative to the inlet end of the counter bore 20 of the passage 18. The poppet-type valve 22 includes an elongated valve stem 24 slidably received through a spider 26 forming a portion of the seat body 16 at the downstream end of the passage 18 and a valve poppet 28 mounted on the upstream end of the valve stem 24, a compression spring 30 being disposed about the valve stem 24 between the valve poppet 28 and the shoulder 3 at the downstream end of the counter bore 20.

The assemblage illustrated in FIG. 1 is to be considered as prior art and fluid flows through the passage 12 in the direction of the arrows 34.

Under low fluid flow conditions the compression spring 30 maintains the valve poppet 28 in a position spaced upstream from the upstream end of the seat body and fluid flow is maintained through the passage 12.

However, upon an increase of fluid flow above a predetermined flow rate the valve poppet 28 constitutes a restriction and therefore a drag to the free flow of fluid through the passage 12 and the increase in pressure differential (a greater pressure on the upstream side of the valve poppet 28 than on the downstream side thereof) overcomes the biasing action of the spring 30 and the poppet valve shifts to the left from the position thereof illustrated in FIG. 1 in solid lines to the position illustrated in phantom lines wherein the valve poppet 28 closes the upstream or inlet end of the counter bore 20, thus terminating all fluid flow through the passage 12.

The check valve assembly 14 illustrated in FIG. 1 has inherent operating disadvantages including the fact that the spring 30 exerts increasing force against the fluid flow as the valve poppet 28 moves toward the closed position. In addition, exact reproduction of spring performance is difficult and expensive and it is therefore difficult and expensive to make excess flow check valves with repeatably accurate closing pressures. This is especially true for low flow excess flow check valves. Still further, the spring 30 and poppet valve 22 are relatively heavy. Therefore, the check valve assembly 14 is gravity sensitive and not readily adaptable for use in low flow and low pressure differential situations.

Figure 2:
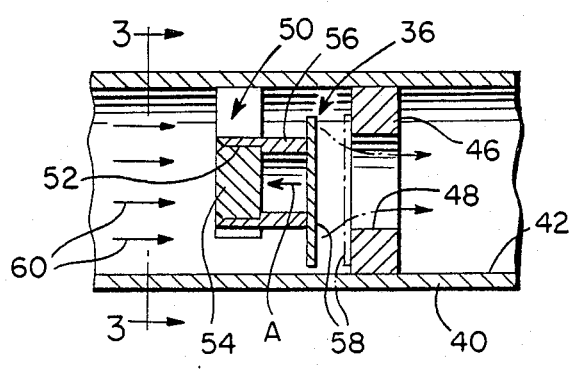
FIG. 2 is a longitudinal sectional view similar to FIG. 1 but illustrating a check valve constructed in accordance with the present invention and utilizing a permanent magnet to attract the valve member toward an open position.
Figure 3:
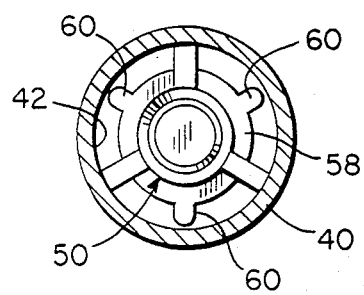
FIG. 3 is a transverse sectional view taken substantially upon the plane indicated by the section line 3—3 of FIG. 2 illustrating the general circular cross-sectional shape of a valve plate incorporating three equally peripherally spaced guide projections.

With reference now more specifically to FIGS. 2 and 3 of the drawings, a check valve form of a magnetically operated flow device assembly constructed in accordance with the present invention is referred to in general by the reference numeral 36. The magnetically operated flow device assembly 36 is disposed within a conduit 40 defining a flow passage 42 therethrough and incorporates an annular seat body 46 stationarily secured within the passage 42 in any convenient manner and defining a flow passage 48 therethrough. In addition, a spider-type support assembly referred to in general by the reference numeral 50 is mounted within the passage 42 upstream from the seat body 46. The central portion of the support assembly 50 defines an upstream opening 52 in which a permanent magnet 54 is seated and a downstream sleeve-type extension 56 against which a valve plate 58 is magnetically attracted with a force represented by A in FIG. 2. The length of extension 56 controls the magnetic force A. The valve plate 58 is constructed entirely or partially of ferrous material.

From FIG. 3 of the drawings, it may be seen that the valve plate 58 is circular in shape and of a diameter greater than the diameter of the passage 48. Further, the plate 58 includes three equally peripherally spaced and radially outwardly projecting integral projections 60 to slidably index the plate 58 with the surface of the the passage 42. Thus, the valve plate 58 can move from the open solid line position thereof illustrated in FIG. 2 to the closed phantom line position illustrated in FIG. 2 seating against the upstream side of the seat body 46 sealing the flow passage 48.

The magnitude of the magnetic attraction force on plate 58, indicated at A in FIG. 2, is determined by the length of the extension 56. Fluid flow in the direction of the arrows 60 in FIG. 2 through the passage 42 causes a drag force on plate 58 which will cause the valve plate 58 to be unseated from the downstream end of the extension 56 when the fluid drag force matches the magnetic attraction force A. After unseating, plate 58 moves downstream to the closed phantom line position. Plate 58 is held closed by the fluid differential pressure. The distance between the closed position of plate 58 and the magnet 54 is short enough to ensure positive recovery of plate 58 by magnet 54 when the fluid pressure is relieved. Conversely, a reasonable distance must be maintained to minimize flow losses.

Figure 8:
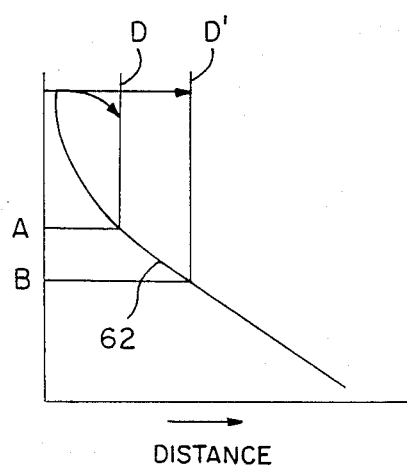
FIG. 8 is a graph indicating a typical magnetic force versus distance curve showing design points for a typical magnetic operator.

From FIG. 8 of the drawings, there may be seen a curve line 62 representing a typical magnetic attraction force of the permanent magnet 54 on the plate 58 according to the distance between the magnet 54 and the plate 58.

The extension 56 distance between the permanent magnet 54 and the plate 58 when the latter is in the open solid line position thereof illustrated in FIG. 2 is designated by D in FIG. 8. The curve 62 indicates that the attracting force A of the permanent magnet on the plate 58 applies in this instance. However, when the plate 58 is in the closed phantom line position illustrated in FIG. 2 represented by distance D' in FIG. 8, the magnetic biasing action is reduced to that indicated at B in FIG. 8. Accordingly, it may be seen that the force A of the permanent magnet 54 on the plate 58 is reduced as the plate 58 moves from the open position to the closed position, this being in contrast to the increased biasing action of the compression spring 30 on the valve poppet 28 as the valve poppet 28 moves from the open solid line poition of FIG. 1 to the closed phantom line position thereof in FIG. 1.

Figure 4:
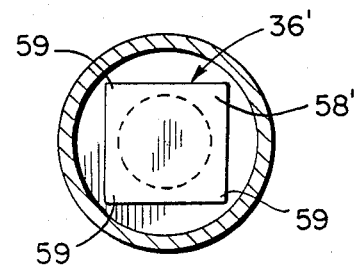
FIG. 4 is a transverse sectional view similar to FIG. 3 but illustrating the use of a valve plate which is generally square in plan shape.

With reference now more specifically to FIG. 4, a modified form of a magnetically operated check valve assembly referred to in general by the reference numeral 36' may be seen. The check valve assembly 36' is identical to the check valve assembly 36, except that the valve plate 58' corresponding to the valve plate 58 is square in shape and includes four corner portions 59 which perform the function of the projections 60 on the plate 58.

Figure 5:
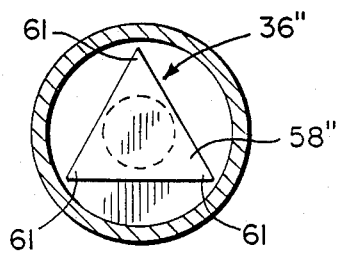
FIG. 5 is a further sectional view similar to FIG. 3, but illustrating the use of a valve plate which is generally triangular in plan shape.

FIG. 5 illustrates a second modified form of a magnetic operator valve assembly referred to in general by the reference numeral 36" and uses a triangular shape plate 58" incorporating three corner portions 61 serving the function of the projections 60 on the valve plate 58.

Figure 6:
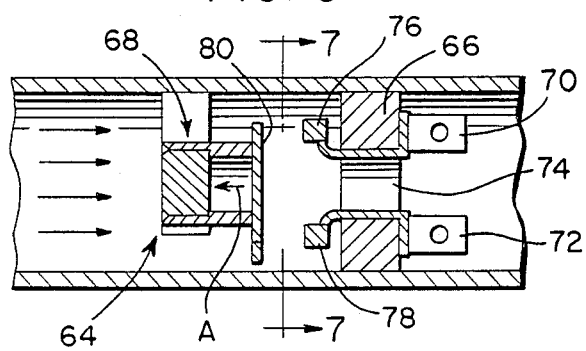
FIG. 6 is a longitudinal sectional view similar to FIG. 2 but illustrating a modified form of a magnetic flow device for electrical flow switches.
Figure 7:
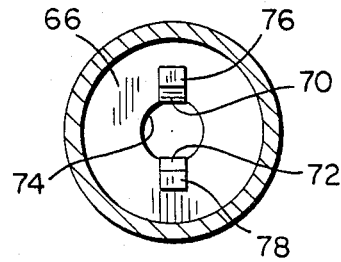
FIG. 7 is a transverse sectional view of FIG. 6 substantially upon the plane indicated by the section line 7—7 of FIG. 6.

With attention now invited more specifically to FIG. 6, a second major form of a magnetic operator valve assembly is referred to in general by the reference numeral 64. The valve assembly 64 actually comprises a control assembly and is substantially identical to the valve assembly 36, except that the seat body 66 thereof corresponding to the seat body 46 contains a pair of terminals 70 and 72 which are stationarily supported from the seat body 66, project through the flow passage 74 corresponding to the flow passage 48 and include contacts 76 and 78 projecting upstream from the seat body 66 for bridging contact by the plate 80 corresponding to the plate 58. Of course, the plate 80, or at least the side thereof opposing the contacts 76 and 78, will be constructed of an electrically conductive material such that when the plate 80 seats against the contacts 76 and 78 an electrical circuit (not shown) will be closed. The terminals 70 and 72 are also constructed of electrically conductive material.

Thus, it may be seen that the basic structure utilized in the construction of the check valve assembly 36 may be modified in order to provide electrical control responsive to an increase in fluid flow past the assembly 64.

Figure 9:
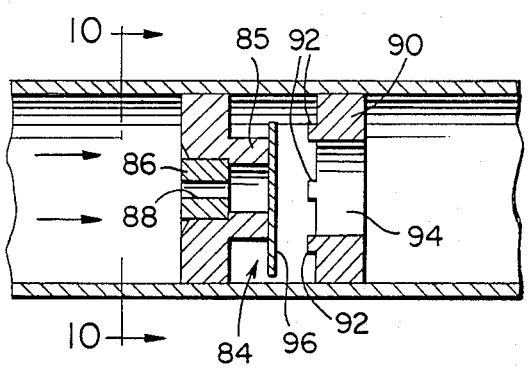
FIG. 9 is a longitudinal sectional view similar to FIG. 2 illustrating the use of a magnet for a flow relief valve.
Figure 10:
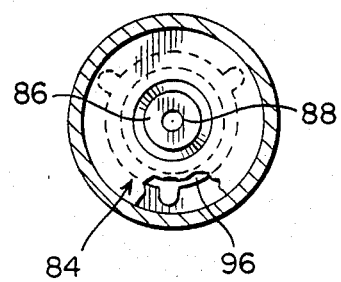
FIG. 10 is a transverse sectional view of FIG. 9 taken substantially upon the plane indicated by the section line 10—10 of FIG. 9.

With attention now invited more specifically to FIGS. 9 and 10 of the drawings, a magnetic operator relief check valve assembly referred to in general by the reference numeral 84 is illustrated. The relief check valve assembly 84 is substantially identical to the check valve assembly 36, except that the permanent magnet 86 thereof has a fluid flow passage 88 formed centrally therethrough and the upstream side of the seat body 90 corresponding to the seat body 46 includes peripherally spaced upstream projections 92 disposed about the inlet end of the flow passage 94 corresponding to the flow passage 48.

The check valve assembly 84 thus operates the reverse of the check valve assembly 36. Relief valve assembly 84 is closed to fluid flow when plate 96 corresponding to plate 58 is retained upstream against seat extension 85 corresponding to extension 56, but it allows fluid flow after it becomes unseated and when it moves downstream against body 90 corresponding to body 46.

Figure 11:
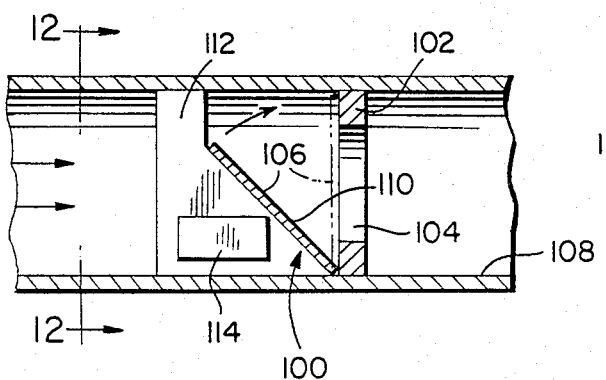
FIG. 11 is a longitudinal sectional view illustrating a first form of swingable valve member.
Figure 12:
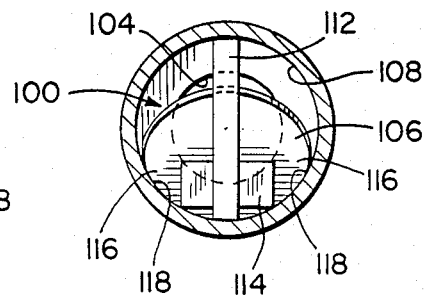
FIG. 12 is a transverse sectional view taken substantially upon the plane indicated by the section line 12—12 of FIG. 11.

With attention now invited more specifically to FIGS. 11 and 12, a further form of a magnetically operated check valve referred to in general by the reference numeral 100 is illustrated and includes a seat body 102 corresponding to the seat body 46 and having a flow passage 104 formed therethrough. Further, the valve assembly 100 includes a freely mounted circular valve disc 106 which is only slightly smaller in diameter than the diameter of the corresponding passage 108 and which does not include guide projections corresponding to the projections 60. Rather, the plate 106 is loosely inclined between the seat body 104 and an inclined centrally disposed surface 110 defined by a support assembly 112 stationarily mounted in the passage 108 and supporting a permanent magnet 114 therefrom. The plate 106, responsive to fluid flow through the passage 108 above a predetermined maximum, swings from the open position thereof illustrated in FIG. 11 to the closed phantom line position thereof against the seat body 102 across the upstream end of the passage 108. In addition to the plate 106 seating against the surface 110, opposite side lower peripheral portions of the plate 106 engage the opposing inner surfaces of the passage 42 as at 118 to stabilize the position of the plate 106 when the latter is in the open position. Of course, the valve assembly 100 is otherwise operational in substantially the same manner as the valve assemblies 36 64.

Figure 13:
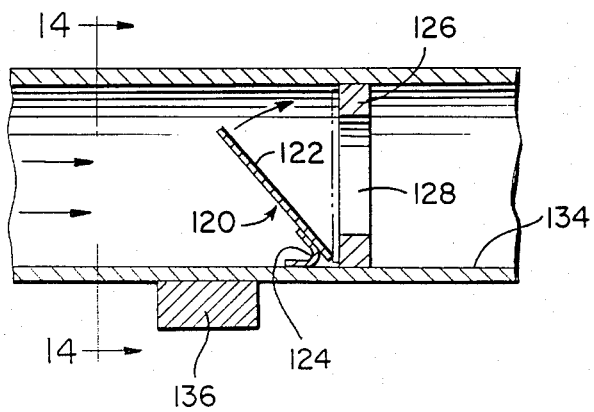
FIG. 13 is a longitudinal sectional view similar to FIG. 11 but illustrating a second form of swingable valve member and utilizing a magnet placed exteriorly to the flow passage.
Figure 14:
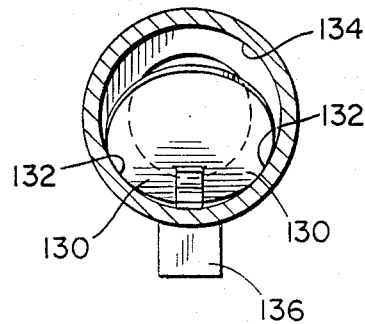
FIG. 14 is a transverse sectional view of FIG. 13 taken substantially upon the plane indicated by the section line 14—14 of FIG. 13.

With reference now to FIGS. 13 and 14, yet another form of magnetically operated valve assembly referred to in general by the reference numeral 120 is illustrated. The valve assembly 120 is similar to the valve assembly 100, except that the valve plate 122 thereof corresponding to the valve plate 106 is hinged from the lower peripheral portion of the inner surface of the passage 42 by a flexible hinge member 124. The hinge member 124 could be a pivot pin. The valve assembly 120 includes a seat body 126 corresponding to the seat body 102 and having a flow passage 128 therethrough corresponding to the flow passage 104 and opposite side lower peripheral portions 130 corresponding to the peripheral portions 116 and which are engageable with opposing inner surface portions 132 of the associated fluid flow passage 134 to limit swinging movement of the valve plate 122 to the open position thereof illustrated in solid lines in FIG. 13. With the valve assembly 120, the associated permanent magnet 136 may be mounted from the exterior surface of the structure defining the flow passage 134, thereby enabling the magnetic action of the magnet 136 on the plate 122 to be varied from the exterior of the flow passage 134. However, the valve assemblies 100 and !20 each remain operative under extremely low fluid flow and pressure differential conditions.

It is pointed out, if desired, the various plates 58, 58', 58'', 80, 96, 106 and 122 could, alternatively, be constructed of magnetic material and that the corresponding magnets could be constructed of ferrous materials. In addition, it is also possible that the various valve plates and seat bodies could be produced such that they magnetically repel each other. However, utilizing repelling magnetic biasing means as opposed to attracting magnetic biasing means would result in the biasing force increasing as the valve discs move toward their closed positions, much in the same manner in which the biasing action of the spring 30 increases as the valve poppet 28 moves toward the closed position. Nevertheless, the overall weight of the movable portions of the valve assemblies illustrated in FIGS. 2–7 and 8–14 would be very small relative to the weight of the poppet-type valve 22 illustrated in FIG. 1.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A magnetically operated flow device disposed within a flow passage defined by an encircling inwardly facing wall and defining upstream and downstream directions, said flow passage being at least generally regular in transverse cross-sectional shape about a central zone of said flow passage, a thin, lightweight, flat and magnetically attracted flow responsive valve plate disposed in said flow passage and movable therein in upstream and downstream directions between upstream and downstream limit positions and constituting a partial drag obstruction to fluid flow through said passage outwardly of said central zone and thus being biased in a downstream direction by fluid flow through said passage in said downstream direction, support means mounted in said central zone upstream from said upstream limit position in spaced relation relative to the wall of said flow passage for fluid flow through said passage in said downstream direction about said support means, said support means including an abutment portion in said central zone projecting from said support means in said downstream direction and defining a downstream facing abutment against which said valve plate may abut to define said upstream limit position thereof with said valve plate disposed generally normal to the longitudinal extent of said passgge, magnet means mounted from said support means centrally in said passage and spaced a predetermined distance upstream from said upstream limit position of said valve plate to define a predetermined gap between said magnet and said valve plate when the latter is in said upstream limit position, said valve plate occupying a sufficient cross-sectional area of said passage outwardly of said central zone to effect said partial drag obstruction, said gap being of a dimension measured longitudinally of said flow passage and the magnetic attraction between said magnet and said valve plate when the latter is in the upstream limit position thereof being sufficiently low such that low gas flow at low differential pressure less than one PSI will be sufficient to shift said valve plate in said downstream direction from said upstream limit position to said downstream limit position, an annular seat body mounted transverse in said passage from said wall with one axial end thereof positioned for abutment by said valve plate when the latter is in said downstream limit position and disposed generally normal to said passage, said valve plate including a central imperforate portion thereof of greater area than the area bound by the inner periphery of said annular seat body, the magnetic attraction between said magnet and valve plate, when the latter is in said downstream limit position and said valve plate is free of differential pressure acting thereon, being sufficient to effect positive magnetic retrieval of said valve plate in said upstream direction from said downstream limit position to said upstream limit position, said valve plate including an outer periphery defining peripherally spaced guide projections in close proximity to said flow passage all for guiding movement of said valve plate between said upstream and downstream limit positions.

2. The magnetically operated flow device of claim 1 wherein said plate is generally circular in outline shape.

3. The magnetically operated device of claim 1 wherein said plate is generally triangular in outline shape.

4. The magnetically operated device of claim 1 wherein said plate is generally square in outline shape.

5. The magnetically operated flow device of claim 1 wherein said projections are in close proximity to the flow passage wall for guiding its movement with respect to the flow passage wall.

6. The magnetically operated flow device of claim 1 wherein said annular seat body includes upstream facing electrical contacts such that said flat valve plate completes an electrical circuit when fluid drag force decouples it from the upstream limit position means.

* * * * *